US011733630B2

(12) United States Patent
Funaba

(10) Patent No.: US 11,733,630 B2
(45) Date of Patent: Aug. 22, 2023

(54) SYSTEM FOR SWITCHING BETWEEN SUPPLYING AND CUTTING OFF ELECTRONIC POWER DEPENDING WHETHER A HOUSING COVER IS OPEN OR CLOSED

(71) Applicant: CANON KABUSHIKI KAISHA, Tokyo (JP)

(72) Inventor: Hiroshi Funaba, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 17/548,681

(22) Filed: Dec. 13, 2021

(65) Prior Publication Data
US 2022/0197203 A1 Jun. 23, 2022

(30) Foreign Application Priority Data

Dec. 17, 2020 (JP) .................. 2020-209555

(51) Int. Cl.
G03G 15/00 (2006.01)
H01H 47/00 (2006.01)
F16P 3/08 (2006.01)
B41J 29/13 (2006.01)

(52) U.S. Cl.
CPC .......... G03G 15/5004 (2013.01); B41J 29/13 (2013.01); F16P 3/08 (2013.01); G03G 15/80 (2013.01); H01H 47/005 (2013.01)

(58) Field of Classification Search
USPC .......................................... 399/88
See application file for complete search history.

(56) References Cited

U.S. PATENT DOCUMENTS 7,460,808 B2* 12/2008 Okada .................... G03G 15/80
399/88
10,663,920 B2 5/2020 Funaba
2021/0286310 A1* 9/2021 Hara ..................... G03G 15/80
2022/0019171 A1 1/2022 Funaba

FOREIGN PATENT DOCUMENTS

JP 4124438 B2 7/2008

* cited by examiner

Primary Examiner — Quana Grainger
(74) Attorney, Agent, or Firm — Venable LLP

(57) ABSTRACT

An image forming system comprises a first housing, a second housing and a third housing. The second housing may comprise a motor, a first door and a first switch. The first switch is provided on an electrical path connecting a power supply and the motor, for switching between a first state and a second state and for switching from the first state to the second state. The third housing may comprise a load. When the first door is opened in a state where the first switch is in the first state, the first switch switches from the first state to the second state to cause supply of electric power to the load to be cut off.

8 Claims, 4 Drawing Sheets

SYSTEM FOR SWITCHING BETWEEN SUPPLYING AND CUTTING OFF ELECTRONIC POWER DEPENDING WHETHER A HOUSING COVER IS OPEN OR CLOSED

BACKGROUND OF THE INVENTION

Field of the Invention

The present invention relates to a system for switching between supplying and cutting off electric power depending whether a housing cover is open or closed, and specifically relates to an image forming system.

Description of the Related Art

An image forming apparatus is provided with an interlock mechanism that cuts off the supply of electric power to the drive source when a user opens a maintenance cover for accessing inside the image forming apparatus. According to the technology described in Japanese Patent No. 4124438, the supply of electric power to a load is cut off by a relay that turns on and off in sync with the opening and closing of a cover.

In order to efficiently develop various different types of image forming apparatuses, it is conceivable that a fixing apparatus developed under the premise that it will connect to an image transfer apparatus of a certain type may also be used in an image transfer apparatus of a different type. However, in a case where the height of the discharge port of the image transfer apparatus of the certain type and the height of the discharge port of the image transfer apparatus of the different type are different, this fixing apparatus cannot connect to the image transfer apparatus of the different type. Thus, a conveying apparatus for relaying sheets is required between the fixing apparatus and the image transfer apparatus of the different type. Such a conveying apparatus conveys sheets with an unfixed toner image. When the height of the opening of a communicating portion connecting the conveying apparatus and the fixing apparatus is not sufficient, the toner image may come into contact with the edge of the opening and be disturbed. For this reason, the opening is designed to be large.

Such a conveying apparatus also requires a maintenance door (cover) for the removal of jammed sheets. Here, if the opening of the communicating portion is large, when the cover of the conveying apparatus is opened, the user may be able to access the load of the fixing apparatus via the communicating portion from the inside of the housing of the conveying apparatus. This may make the load malfunction. Here, an example using a conveying apparatus and a fixing apparatus has been given, however a similar problem arises between adjacent housings.

SUMMARY OF THE INVENTION

The present invention provides an image forming system comprising a first housing provided with a transfer unit that transfers a toner image to a recording medium, a second housing provided downstream of the first housing in a conveyance direction in which the recording medium is conveyed, the second housing including a conveying unit that conveys the recording medium which is discharged from the first housing and on which the toner image transferred, and a third housing connected to the second housing, the third housing including a fixing unit that fixes the toner image to the recording medium which is discharged from the second housing and on which the toner image transferred. The second housing comprises a motor that drives the conveying unit, a first door that forms a portion of the second housing and that is opened to expose an inside of the second housing, and a first switch provided on an electrical path connecting a power supply and the motor, the first switch switching between a first state in which the power supply and the motor are connected and a second state in which the motor is cut off from the power supply and the first switch switching from the first state to the second state when the first door is opened in a state where the first switch is in the first state. The third housing comprises a load supplied with electric power from the power supply via the first switch in a state where the first switch is in the first state. When the first door is opened in a state where the first switch is in the first state, the first switch switches from the first state to the second state, causing supply of electric power to the load to be cut off.

Further features of the present invention will become apparent from the following description of exemplary embodiments (with reference to the attached drawings).

DESCRIPTION OF THE EMBODIMENTS

Figure 1:
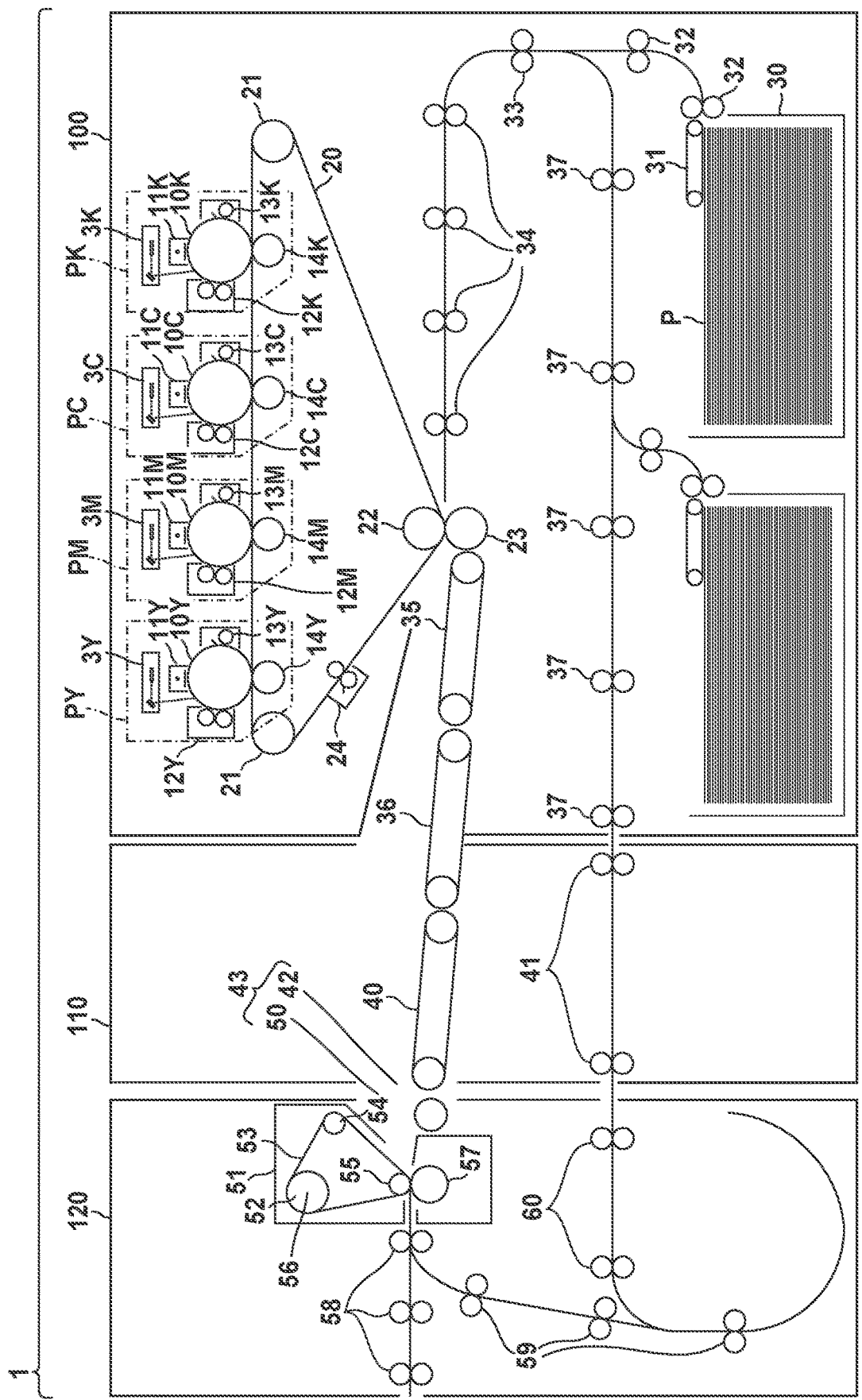
FIG. 1 is a diagram illustrating an image forming system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Image Forming System

As illustrated in FIG. 1, an image forming system 1 of the present embodiment includes three apparatuses. An image forming apparatus 100 transfers a toner image to a sheet P and discharges the sheet P to a conveying apparatus 110. The conveying apparatus 110 is a relay apparatus that receives the sheet P carrying an unfixed toner image from the image forming apparatus 100 and passes it to a fixing apparatus 120. The fixing apparatus 120 applies heat and pressure to the sheet P received from the fixing apparatus 120 and the toner image and fixes the toner image on the sheet P. As illustrated in FIG. 1, the housing of the image forming apparatus 100, the housing of the conveying apparatus 110, and the housing of the fixing apparatus 120 are each separately provided.

The height of the sheet discharge port of the image forming apparatus 100 does not match the height of the sheet receive port of the fixing apparatus 120. This is because the fixing apparatus 120 is designed for an image forming apparatus different from the image forming apparatus 100. In order for the fixing apparatus 120 to be also used with the image forming apparatus 100, the difference in height between the sheet discharge port of the image forming apparatus 100 and the sheet receive port of the fixing apparatus 120 needs to be absorbed. The conveying apparatus 110 is provided to absorb this difference in height.

Image Forming Apparatus

The image forming apparatus 100 will now be described in detail. The image forming apparatus 100 is provided with image forming units PY, PM, PC, PK. The image forming unit PY forms a yellow toner image. The image forming unit PM forms a magenta toner image. The image forming unit PC forms a cyan toner image. The image forming unit PK forms a black toner image. By layering these four toner images, a full color image is formed. In the present embodiment, the characters Y, M, C, K affixed to the end of the reference numbers indicate the toner color. When describing an item in common between the four colors, the characters Y, M, C, K are omitted.

The image forming unit P includes a photosensitive drum 10, a charging device 11, an exposure device 3, a developing device 12, a drum cleaning device 13, and the like. The photosensitive drum 10 is an image carrier that carries an electrostatic latent image or a toner image and rotates. The charging device 11 uniformly charges the surface of the photosensitive drum 10. The exposure device 3 forms an electrostatic latent image corresponding to an image signal by irradiating the surface of the photosensitive drum 10 with a laser beam corresponding to the image signal. The developing device 12 adheres the toner to the electrostatic latent image and forms a toner image. A primary transfer device 14 transfers the toner image from the photosensitive drum 10 to an intermediate transfer belt 20. The drum cleaning device 13 cleans off the toner remaining on the surface of the photosensitive drum 10.

The intermediate transfer belt 20 is an intermediate transfer member or image carrier that is wound around two tension rollers 21 and a secondary transfer inner roller 22 and rotates. One from among the two tension rollers 21 and the secondary transfer inner roller 22 may be the driving roller for driving the intermediate transfer belt 20. The intermediate transfer belt 20 conveys the toner image to a secondary transfer unit. The secondary transfer unit is formed by the secondary transfer inner roller 22 and a secondary transfer outer roller 23. Specifically, the secondary transfer outer roller 23 transfers the toner image from the intermediate transfer belt 20 to the sheet P. A belt cleaning device 24 cleans the toner remaining on the surface of the intermediate transfer belt 20.

The image forming apparatus 100 includes one or more storage containers 30 able to store a plurality of sheets P. A separation belt 31 separates the sheet P located on top of a sheet stack stored in the storage container 30 from the sheet stack and feeds it to a feeding roller 32. The feeding roller 32 conveys the sheet P and passes it to a conveyance roller 33. The conveyance roller 33 conveys the sheet P further downstream in the conveyance direction of the sheet P and passes it to a plurality of registration rollers 34. The plurality of registration rollers 34 form a sheet steering mechanism. A sheet steering mechanism is a mechanism that aligns the length direction or the width direction of the sheet P to be parallel with the conveyance direction of the sheet P. The process may be referred to as skew correction. The plurality of registration rollers 34 convey the sheet P in a manner so that the toner image arrives at the secondary transfer unit and the sheet P arrives at the secondary transfer unit at the same time.

Conveyor belt units 35, 36 are provided downstream of the secondary transfer unit. The conveyor belt units 35, 36 convey the sheet P further downstream. Here, the conveyor belt units 35, 36 may convey the sheet P while applying suction via negative pressure. Negative pressure may be generated by suctioning the air, for example. Note that the sheet P is suctioned to the conveyor belt units 35, 36 via negative pressure to avoid disturbing the unfixed toner image on the sheet P when the sheet P is conveyed at high speeds. The conveyor belt unit 36 passes the sheet P to the conveying apparatus 110.

Conveying Apparatus

A conveyor belt unit 40 of the conveying apparatus 110 conveys the sheet P received from the image forming apparatus 100 to the fixing apparatus 120. The conveyor belt unit 40 may also convey the sheet P while applying suction. The housing of the conveying apparatus 110 is provided with an opening portion 42 that functions as a sheet discharge port. The housing of the fixing apparatus 120 is provided with an opening portion 50 that functions as a sheet receive port. The opening portion 42 and the opening portion 50 are disposed facing one another and form a communicating portion 43. In other words, the sheet P is conveyed from the conveying apparatus 110 to the fixing apparatus 120 via the communicating portion 43. Here, there is an unfixed toner image on the sheet P conveyed from the conveying apparatus 110 to the fixing apparatus 120. The opening area of the opening portion 42 is designed to be sufficiently large enough so that the toner image does not come into contact with the edge of the opening portion 42.

Fixing Apparatus

The fixing apparatus 120 includes a fixing device 51. The fixing device 51 includes a heating belt 53. The heating belt 53 is wound around a heating roller 52, a tension roller 54, and a fixing roller 55 and rotates. A heater 56 is provided inside the heating roller 52. The heater 56 heats the heating belt 53 and maintains the temperature of the heating belt 53 at a predetermined fixed temperature. The fixing roller 55 and a pressing roller 57 form a fixing nip portion. The fixing roller 55 and the pressing roller 57 rotate while sandwiching the heating belt 53. The fixing nip portion applies heat and pressure to the sheet P and fixes the toner image on the sheet P.

In one-sided printing mode, the sheet P is then discharged outside of the fixing apparatus 120 by a discharge roller 58. A discharge tray or a post-processing apparatus may be connected to the outside of the fixing apparatus 120. The post-processing apparatus executes post-processing (for example, bookbinding, binding processing, punch processing) on the sheet P.

In double-sided printing mode, the sheet P with the toner image formed on a first surface is returned to the image forming apparatus 100 via the conveying apparatus 110. In other words, the front and back of the sheet P are reversed (switch back reversal) by a reverse roller 59 taking in the sheet P and passing the sheet P to a conveyance roller 60. The conveyance roller 60 conveys the sheet P and passes it to a conveyance roller 41 of the conveying apparatus 110. The conveyance roller 41 further conveys the sheet P and passes the sheet P to a conveyance roller 37 of the image forming apparatus 100. The conveyance roller 37 conveys the sheet P and passes the sheet P to the conveyance roller 33. The conveyance roller 33 passes the sheet P to the registration rollers 34. The registration rollers 34 again convey the sheet P to the secondary transfer unit. The secondary transfer unit transfers a toner image on a second surface of the sheet P. Then, the sheet P is discharged to the outside of the fixing apparatus 120 via the conveying apparatus 110 and the fixing apparatus 120.

Image Forming Apparatus Appearance

Figure 2A:
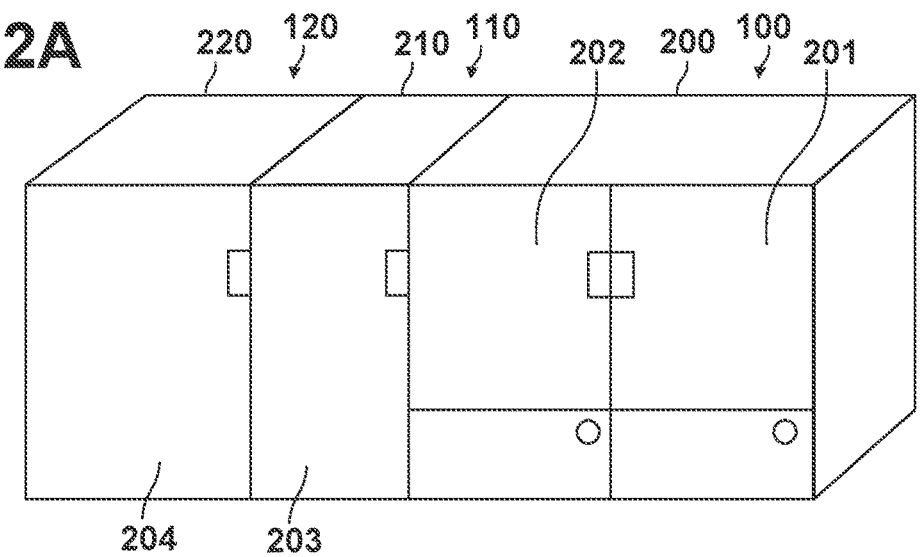
FIGS. 2A to 2C are a diagram for describing the opening and closing of a maintenance door.

FIG. 2A is a diagram illustrating covers 201 to 204 in a closed state. The covers 201, 202 are maintenance doors that form a portion of a housing 200 of the image forming apparatus 100. The covers 201, 202 are opened by the user when the sheet P is jammed. After the sheet P is removed, the covers 201, 202 is closed.

The cover 203 forms a portion of a housing 210 of the conveying apparatus 110. When the sheet P is jammed in the conveying apparatus 110, the user opens the cover 203 and removes the sheet P.

The cover 204 forms a portion of a housing 220 of the fixing apparatus 120. When the sheet P is jammed in the fixing apparatus 120, the user opens the cover 204 and removes the sheet P.

Figure 2B:
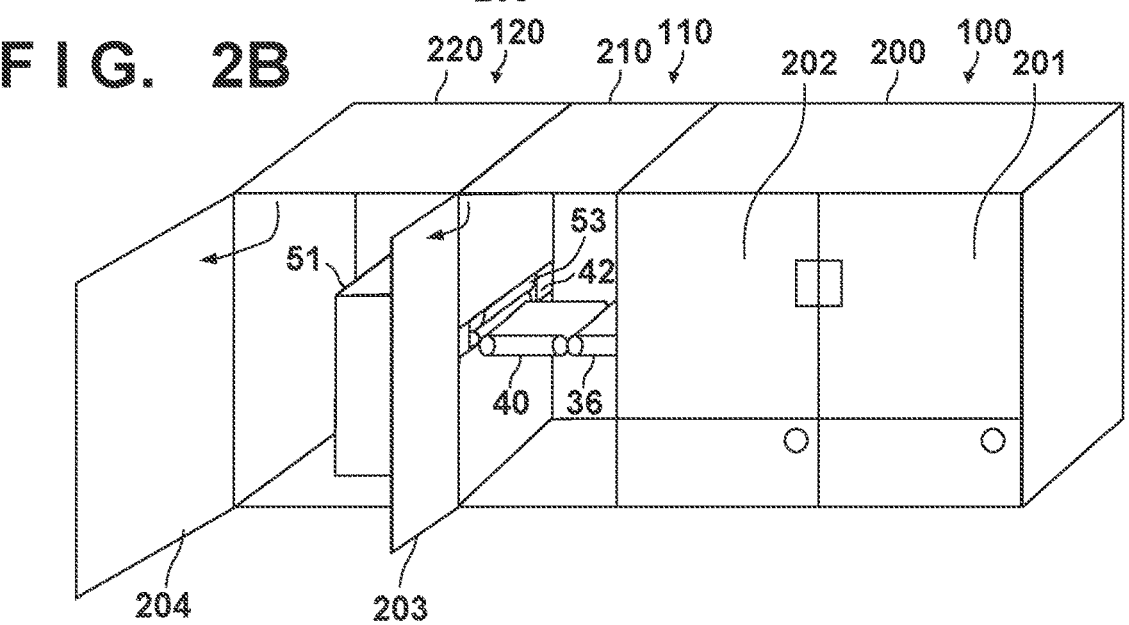
Figure 2C:
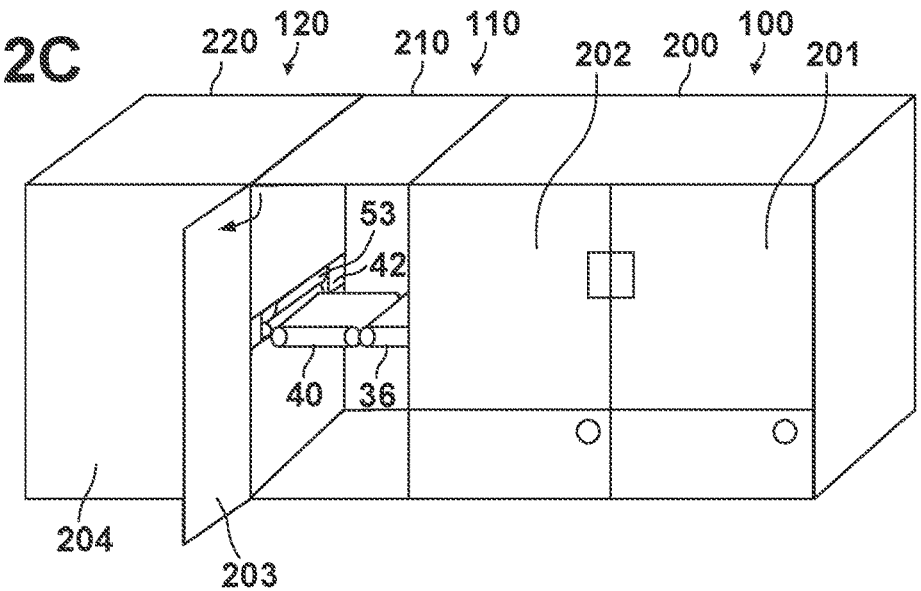

FIG. 2B is a diagram illustrating the covers 203, 204 in an open state. FIG. 2C is a diagram illustrating the cover 203 in an open state and the cover 204 in a closed state. As illustrated in FIGS. 2B and 2C, the opening portion 42 is provided in the housing 210. When the cover 203 is open, the user can access at least one load (for example, the heating belt 53 wound around the fixing roller 55) of the fixing apparatus 120 from the inside of the housing 210 of the conveying apparatus 110. This is because the opening area of the opening portion 42 is large. The fixing device 51 including the heating belt 53 may be caused to malfunction by the user touching the heating belt 53 through the opening portion 42. Thus, when the cover 203 is open, the electric power supply should also be cut off to at least one load of the fixing apparatus 120 and not just the load/s provided inside the conveying apparatus 110. At least one load of the fixing apparatus 120 includes at least the fixing device 51. In other words, the supply of electric power to the motor driving the heating belt 53 is cut off.

Interlock Mechanism

EXAMPLE 1

Interlock Mechanism of Image Forming Apparatus

Figure 3:
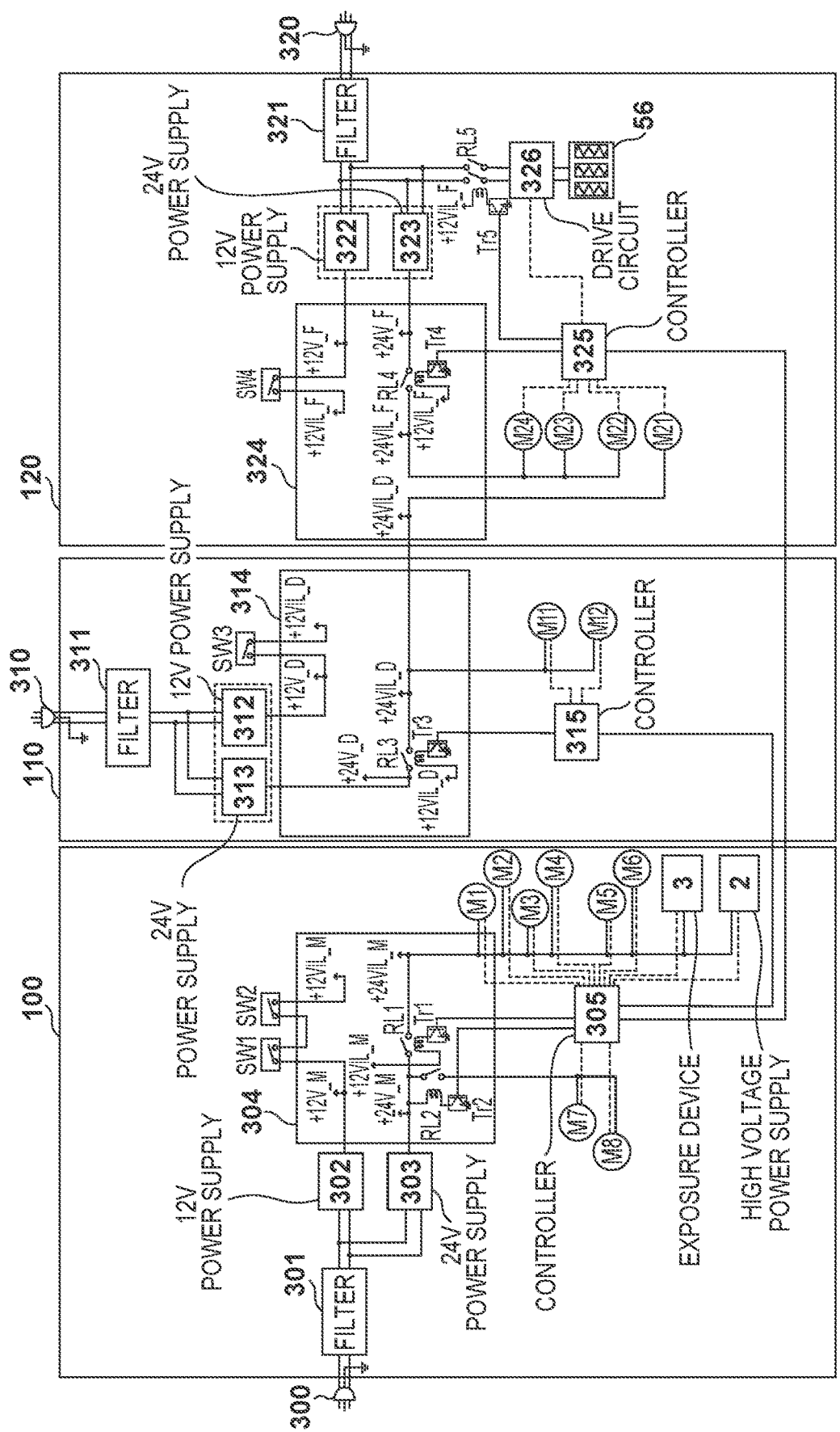
FIG. 3 is a diagram for describing an interlock mechanism of Example 1.

As illustrated in FIG. 3, the image forming apparatus 100 is supplied with AC voltage from a commercial AC power supply via a power cord 300. The power cord 300 is connected to a filter 301. The filter 301 removes AC voltage noise and supplies AC voltage to a 12 V power supply 302 and a 24 V power supply 303. The 12 V power supply 302 is a power supply circuit that converts AC voltage into +12 V DC voltage. The 24 V power supply 303 is a power supply circuit that converts AC voltage into +24 V DC voltage. Hereinafter, +12 V in the section upstream of a switch SW1 is written as +12 V_M, and +12 V in the section downstream of a switch SW2 is written as +12 VIL_M. +12 V_M and +12 VIL_M may be understood as representing the electric power supply system for supplying +12 V. The electric power supply system may include a power supply line or cable. In a similar manner, +24 V DC voltage in the section upstream of a relay RL1 is written as +24 V_M, and +24 V DC voltage in the section downstream of the relay RL1 is written as +24 VIL_M. The +24 V_M and +24 VIL_M may be understood as representing the electric power supply system for supplying +24 V. The DC voltage +12 V_M and +24 V_M are input to a relay unit 304.

The relay unit 304 converts the +12 V_M output from the 12 V power supply 302 to a predetermined DC voltage (for example, 5V, 3.3 V, or the like) and supplies this to a controller 305. The +12 V_M connects to the first end of the switch SW1. The second end of the switch SW1 is connected to the first end of the switch SW2. The second end of the switch SW2 applies the +12 VIL_M to the first end of the coil of the relay RL1. The switch SW1 is an interlock switch that turns on and off in sync with the opening and closing of the cover 201. The switch SW2 is an interlock switch that turns on and off in sync with the opening and closing of the cover 202. Note that the switches SW1, SW2 and the relay RL1 are only required to be able to cut off the supply of electric power to a load when the cover 201, 202 is open. In other words, when the cover 201 or the cover 202 is open, the two contact points of the relay RL1 are open and the supply of the DC voltage +24 VIL_M is cut off. When both the cover 201 and the cover 202 are closed, the switches SW1, SW2 are both turned on, and the two contact points of the relay RL1 are closed and the DC voltage +24 VIL_M can be supplied.

In this manner, the +12 VIL_M supplied via the switches SW1, SW2 is used as the operating voltage of the coil of the relay RL1. A collector of a transistor Tr1 is connected to the second end of the coil of the relay RL1. An emitter of the transistor Tr1 is connected to a ground. A base of the transistor Tr1 is connected to the controller 305.

The DC voltage +24 V_M generated by the 24 V power supply 303 is applied to the upstream contact point of the relay RL1, the first end of the coil of a relay RL2, and the upstream contact point of the relay RL2. A collector of a transistor Tr2 is connected to the second end of the coil of the relay RL2. An emitter of the transistor Tr2 is connected to a ground. A base of the transistor Tr2 is connected to controller 305.

The downstream contact point of the relay RL1 is connected to the exposure device 3, a high voltage power supply 2, and motors M1 to M6 for supplying the +24 VIL_M. The motor M1 drives the photosensitive drum 10. The motor M2 drives the developing sleeve of the developing device 12. The motor M3 drives the intermediate transfer belt 20. The motor M4 drives the registration rollers 34. The motor M5 drives the conveyor belt units 35, 36. The motor M6 drives the conveyance roller 37. The high voltage power supply 2 generates a charging voltage, a development voltage, and a transfer voltage.

The downstream contact point of the relay RL2 is connected to motors M7, M8 for supplying the +24 V_M. The motor M7 drives the separation belt 31 and the feeding roller 32. The motor M8 drives the conveyance roller 33.

The controller 305 controls the electric power supply to the load/s by outputting a control signal to the base of the transistor Tr1 and the transistor Tr2. When the controller 305 is activated, the controller 305 turns on the transistors Tr1, Tr2 and supplies electric power to the motors M1 to M8, the exposure device 3, and the high voltage power supply 2. Image formation is executed by the controller 305 outputting an operation command signal to the exposure device 3, the high voltage power supply 2, and the motors M1 to M8. The controller 305 executes serial communication with a controller 315 of the conveying apparatus 110 and a controller 325 of the fixing apparatus 120 to control the conveying apparatus 110 and the fixing apparatus 120.

Interlock Mechanism of Conveying Apparatus

The conveying apparatus 110 is connected to a commercial AC power supply via a power cord 310. The power cord 310 is connected to a filter 311. The filter 311 removes AC voltage noise and supplies AC voltage to a 12 V power supply 312 and a 24 V power supply 313. The 12 V power supply 312 is a power supply circuit that converts AC voltage into +12 V DC voltage. The 24 V power supply 313 is a power supply circuit that converts AC voltage into +24 V DC voltage. Hereinafter, the +12 V DC voltage in the section upstream of a switch SW3 is written as +12 V_D, and +12 V DC voltage in the section downstream of the switch SW3 is written as +12 VIL_D. +12 V_D and +12 VIL_D may be understood as representing the electric power supply system for supplying +12 V. In a similar manner, +24 V DC voltage in the section upstream of a relay RL3 is written as +24 V_D, and +24 V DC voltage in the section downstream of the relay RL3 is written as +24 VIL_D. The +24 V_D and +24 VIL_D may be understood as representing the electric power supply system for supplying +24 V. The DC voltage +12 V_D and +24 V_D are input to a relay unit 314.

The relay unit 314 converts the +12 V_D DC voltage output from the 12 V power supply 312 to a predetermined DC voltage (for example, 5V, 3.3 V, or the like) and supplies this to the controller 315. The relay unit 314 applies the +12 V_D to the first end of the switch SW3. The switch SW3 is an interlock switch that turns on and off in sync with the opening and closing of the cover 203. The second end of the switch SW3 supplies the +12 VIL_D to the first end of the coil of the relay RL3. In this manner, the +12 VIL_D DC voltage can be supplied when the cover 204 is closed and is prohibited (cut off) from being supplied when the cover 204 is closed.

The +12 VIL_D is used as the operating voltage of the coil of the relay RL3. A collector of a transistor Tr3 is connected to the second end of the coil. The 24 V power supply 313 is connected to the upstream contact point of the relay RL3 and applies the +24 V_D to the upstream contact point of the relay RL3. +24 VIL_D DC voltage is generated at the downstream contact point of the relay RL3. The downstream contact point of the relay RL3 is connected not only to motors M11, M12 but also to a motor M21 of the fixing apparatus 120. The downstream contact point of the relay RL3 supplies the +24 VIL_D DC voltage to these.

An emitter of the transistor Tr3 is connected to a ground. A base of the transistor Tr3 is connected to the controller 315. The controller 315 controls the +24 VIL_D supply to the load/s by outputting a control signal to the base of the transistor Tr3. For example, when an activation request is entered to the controller 315 from the controller 305, the controller 315 turns on the transistor Tr3 and supplies the +24 VIL_D to the motors M11, M12 and the like. When the cover 203 is open, the +24 VIL_D is cut off by the switch SW3 and the relay RL3.

Interlock Mechanism of Fixing Apparatus

The fixing apparatus 120 is connected to a commercial AC power supply via a power cord 320. The power cord 320 is connected to a filter 321. The filter 321 removes AC voltage noise and supplies AC voltage to a 12 V power supply 322, a 24 V power supply 323 and the upstream contact point of a relay RL6. The 12 V power supply 322 is a power supply circuit that converts AC voltage into +12 V DC voltage. The 24 V power supply 323 is a power supply circuit that converts AC voltage into +24 V DC voltage. Hereinafter, the +12 V DC voltage in the section upstream of a switch SW4 is written as +12 V_F, and the +12 V DC voltage in the section downstream of the switch SW4 is written as +12 VIL_F. +12 V_F and +12 VIL_F may be understood as representing the electric power supply system for supplying +12 V. In a similar manner, +24 V DC voltage in the section upstream of a relay RL4 is written as +24 V_F, and +24 V DC voltage in the section downstream of the relay RL4 is written as +24 VIL_F. The +24 V_F and +24 VIL_F may be understood as representing the electric power supply system for supplying +24 V. The DC voltage +12 V_F and +24 V_F are input to a relay unit 324. The heater 56 is connected to the downstream contact point of a relay RL5 via a drive circuit 326.

The relay unit 324 converts the +12 V_F output from the 12 V power supply 322 to a predetermined DC voltage (for example, 5V, 3.3 V, or the like) and supplies this to the controller 325. The relay unit 324 supplies the +12 V_F to the first end of the switch SW4. The switch SW4 is an interlock switch that turns on and off in sync with the opening and closing of the cover 204. The second end of the switch SW4 is connected to the first end of the coil of the relay RL4 and the first end of the coil of the relay RL5. In other words, the +12 VIL_F is used as the operating voltage of the coil of the relay RL4 and the operating voltage of the coil of the relay RL5. When the cover 204 is open, the supply of the +12 VIL_F is cut off, and thus both the relay RL4 and the relay RL5 are turned off (cut off state).

A collector of a transistor Tr4 is connected to the second end of the coil of the relay RL4. A collector of a transistor Tr5 is connected to the second end of the coil of the relay RL5. Emitters of the transistors Tr4, Tr5 are connected to a ground. Bases of the transistors Tr4, Tr5 are connected to the controller 325.

The +24 V_F is applied to the upstream contact point of the relay RL4. The downstream contact point of the relay RL4 is connected to motors M22 to M24 for supplying the +24 VIL_F. The motor M22 drives the discharge roller 58. The motor M23 drives the reverse roller 59. The motor M24 drives the conveyance roller 60. Here, the motor M21 is the motor that drives the fixing device 51. The operating voltage of the motor M21 is the +24 VIL_D supplied from the conveying apparatus 110.

The controller 325 controls the electric power supply to the load/s by outputting a control signal to the base of the transistor Tr4 and the transistor Tr5. When an activation request is received from the controller 305, the controller 325 turns on the transistors Tr4, Tr5 and allows electric power to be supplied to the load/s. For example, the controller 325 controls the electric power to the heater 56 via the transistor Tr5, the relay RL5, and the drive circuit 326 and maintains the temperature of the heating belt 53 at a target temperature.

Details of Electric Power Cut Off when Cover Open

As described above, opening and closing the cover 201 of the image forming apparatus 100 turns the switch SW1 on and off. Opening and closing the cover 202 turns the switch SW2 on and off. Because the switch SW1 and the switch SW2 are connected in series, when either the switch SW1 or the switch SW2 is turned off, the supply of the +12 VIL_M is cut off (stopped). This causes the coil of the relay RL1 to lose the operating voltage, in turn causing the load connected to the downstream contact point of the relay RL1 to be cut off from the operating voltage, i.e., the +24 VIL_M.

When the cover 203 of the conveying apparatus 110 is open, the switch SW3 is turned off and the supply of the +12 VIL_D is cut off. The coil of the relay RL3 loses the operating voltage, i.e., the +12 VIL_D, and the relay RL3 is turned off. The motors M11, M12 connected to the downstream contact point of the relay RL3 and the motor M21 of the fixing apparatus 120 lose the operating voltage, i.e., the +24 VIL_D, and stop.

When the cover 204 of the fixing apparatus 120 is open, the switch SW4 is turned off. This causes the relays RL4, RL5 to lose the operating voltage, i.e., the +12 VIL_F, turning the relays RL4, RL5 off. The motors M22 to M24 connected to the downstream contact point of the relay RL4 lose the operating voltage, i.e., the +24 VIL_F. The drive circuit 326 and the heater 56 connected to the downstream contact point of the relay RL5 lose the AC voltage. Note that even when the cover 204 is open, the motor M21 does not lose the operating voltage.

According to Example 1, there is the communicating portion 43 which allows access inside the housing 220 of the fixing apparatus 120 via the inside of the housing 210 of the conveying apparatus 110. Thus, when the cover 203 of the conveying apparatus 110 is open, the supply of electric power to at least one load (for example, the motor M21 that drives the heating belt 53) of the fixing apparatus 120 is cut off. This prevents the malfunction of at least one load provided in the fixing apparatus 120.

EXAMPLE 2

Figure 4:
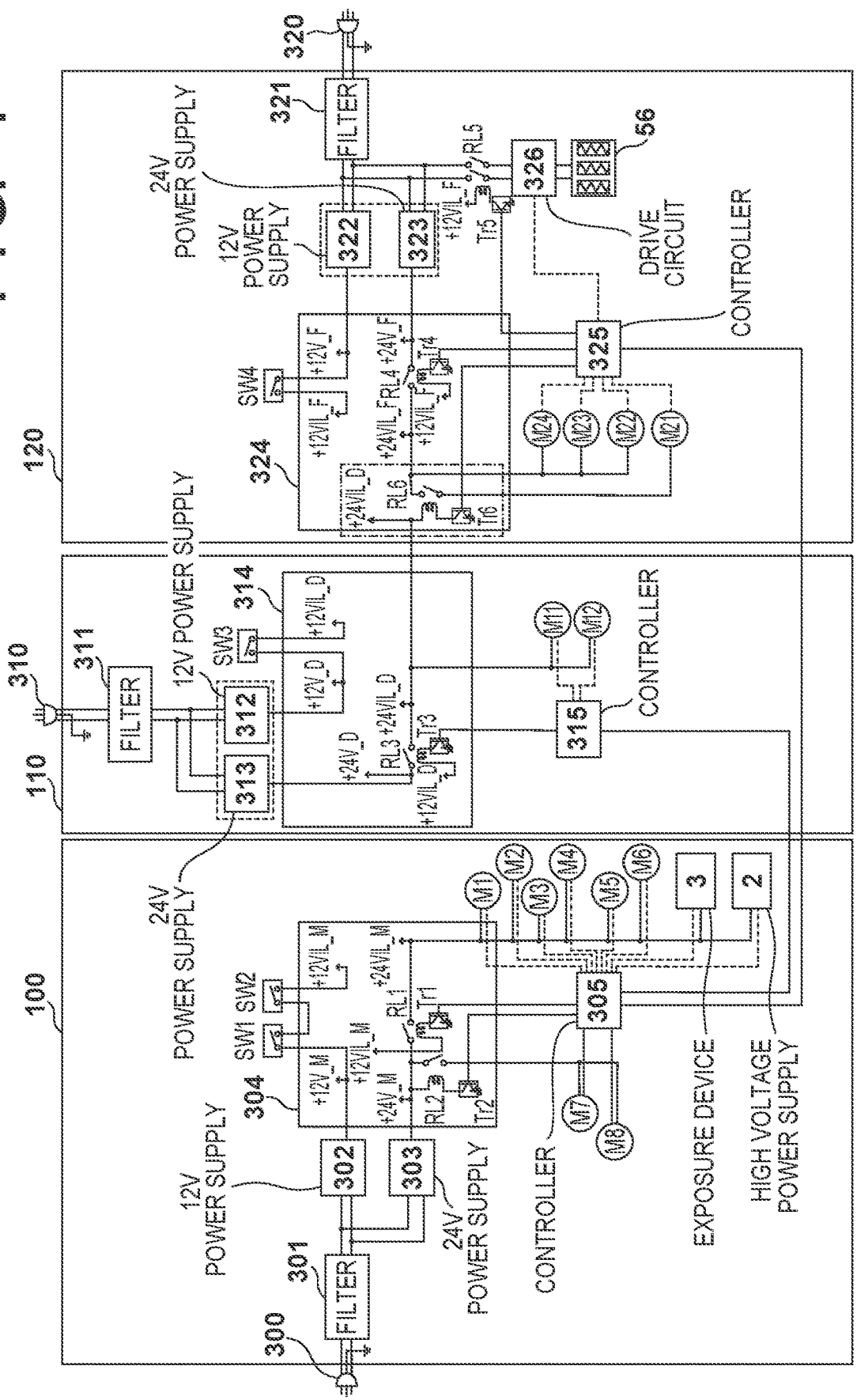
FIG. 4 is a diagram for describing an interlock mechanism of Example 2.

FIG. 4 is a diagram illustrating an interlock mechanism according to Example 2. As seen via a comparison with FIG. 3, the change is in the portion surrounded by the dot-dash line in FIG. 4. Descriptions of the portions of Example 2 shared with Example 1 are omitted.

As illustrated in FIG. 4, the motor M21 of the fixing apparatus 120 is supplied with the operating voltage, i.e., the +24 VIL_F, via the relay RL6. Here, to the first end of the coil of the relay RL6, as the operating voltage, the +24 VIL_D is supplied from the conveying apparatus 110. A collector of a transistor Tr6 is connected to the second end of the coil. An emitter of the transistor Tr6 is connected to a ground. A base of the transistor Tr6 is connected to the controller 325. The controller 325 controls the start of rotation and the stop of rotation of the motor M21 via the transistor Tr6. The upstream contact point of the relay RL6 is connected to the downstream contact point of the relay RL4 and is supplied with the +24 VIL_F. The downstream contact point of the relay RL6 is connected to the motor M21.

When the cover 203 of the conveying apparatus 110 is open, the coil of the relay RL6 loses the operating voltage, i.e., the +24 VIL_D. This causes the relay RL6 to cut off supply of the +24 VIL_F, causing the motor M21 to lose the operating voltage, i.e., the +24 VIL_F.

In Example 1, the operating voltage of the motor M21 is the +24 VIL_D. In Example 2, the operating voltage is changed to the +24 VIL_F. However, when the +24 VIL_D is cut off, the motor M21 loses the operating voltage. This point is shared by both Example 1 and the Example 2.

In Example 1, even when the cover 204 of the fixing apparatus 120 is open, the motor M21 does not lose the operating voltage. However, in Example 2, when the cover 204 is open, the motor M21 loses the operating voltage. In Example 1, to reduce access to the heating belt 53 of the fixing device 51 when the cover 204 of the fixing apparatus 120 is open, the fixing device 51 may be required to be provided with a protective member. Example 2 is advantageous in that such a protective member can be omitted.

OTHER EXAMPLES

In the Examples described above, when the cover 203 of the conveying apparatus 110 is open, the electric power to the motor of the fixing apparatus 120 is cut off. However, the load is not limited to being only a motor and may be a heater (for example, the heater 56). In other words, when the cover 203 of the conveying apparatus 110 is open, the power to the heater of the fixing apparatus 120 may be cut off. Also, when the cover 203 of the conveying apparatus 110 is open, the power to the heater and the motor of the fixing apparatus 120 may be cut off. For example, as illustrated in FIG. 3, the relay RL5 supplies electric power to the heater 56. Thus, the relay RL5 can be configured to switch from on to off when the cover 203 of the conveying apparatus 110 is open. An example of a method of implementing this includes stopping the supply of the operating voltage, i.e., the +12 VIL_F, applied to the first end of the coil of the relay RL5 when the cover 203 of the conveying apparatus 110 is open. For example, instead of the +12 VIL_F, the +12 VIL_D or the +24 VIL_D generated at the conveying apparatus 110 can be supplied as the operating voltage of the coil of the relay RL5. In a case where the +24 VIL_D is used, a resistance circuit (voltage divider circuit) or a regulator that reduces the voltage of the +24 VIL_D to +12 V may be used. Note that in this case, a power line for supplying the +12 VIL_D or the +24 VIL_D from the conveying apparatus 110 to the first end of the coil of the relay RL5 is additionally provided.

Alternatively, the transistor Tr5, which is the switching element connected to the second end of the coil of the relay RL5, can be configured to switch from on to off when the cover 203 of the conveying apparatus 110 is open. In order to switch the transistor Tr5 to off, the controller 325 is notified by the controller 315 via the controller 305 that the cover of the conveying apparatus 110 has been opened. When the controller 325 receives a notification indicating that the cover 203 of the conveying apparatus 110 is open, the controller 325 controls a base signal of the transistor Tr5 and switches the transistor Tr5 to off. This stops the supply of electric power to the heater 56.

Technical Ideas Derived from Examples

Perspectives 1, 16

As illustrated in FIG. 1, the conveying apparatus 110 is an example of a first apparatus provided downstream of the image forming apparatus 100 in a sheet conveyance direction, the first apparatus including a first housing. The fixing apparatus 120 is an example of a second apparatus that is supplied with a sheet from the first apparatus, the second apparatus including a second housing capable of connecting to the first housing. The 12 V power supply 312 and the 24 V power supply 312 are each an example of a first power supply that converts AC voltage supplied from an AC power supply into DC voltage. The motors M11, M12 are each an example of a first load provided inside the first housing. The cover 203 is an example of a first door capable of opening and closing forming a portion of the first housing. The switch SW3 is an example of a first interlock switch that switches between on and off in sync with opening and closing of the first door. The +24 VIL_D may be understood as a first supply system that supplies the first load with the DC voltage (for example, +24 V) generated by the first power supply. The relay RL3 is an example of a first switching element that switches between a supply-ready state and a supply-prohibited state for the DC voltage from the first supply system. The first switching element may be configured to switch between the supply-ready state and the supply-prohibited state in sync with at least the first interlock switch turning on and off. The fixing roller 55, the heating belt 53, and the motor M21 are each an example of the second load provided inside the second housing. As illustrated in FIG. 2C and the like, the second load is disposed inside the second housing. However, the second load is capable of being accessed by a user from inside the first housing through a communicating portion of the first housing and the second housing when the first door (for example, the cover 203) is open. As illustrated in FIGS. 3 and 4, supply and cut off of an operating voltage required for operation of the second load is switched between in sync with the first switching element provided in the first apparatus turning on and off. In other words, when the first door is open, the operating voltage required for operation of the second load is cut off. In this manner, in a case where the cover of one of the two adjacent housing is open, supply of electric power to the load provided in the other housing can be appropriately cut off.

Perspective 2

The operating voltage (for example, +24 V) of the second load is supplied from the first power supply of the first apparatus via the first supply system (for example, +24 VIL_D). When the first switching element (for example, the relay RL3) provided in the first apparatus is switched from on to off, the first supply system switches from the supply-ready state to the supply-prohibited state. As a result, the supply of the operating voltage to the second load via the first supply system may be stopped. Because electric power from the first apparatus to the load of the second apparatus is supplied in this manner, the operation of the load of the second apparatus can be stopped via the interlock mechanism of the first apparatus.

Perspective 3

The first switching element may include a switch device (for example, the relay RL3) that operates via DC voltage supplied from the first power supply. The switch device may switch from the supply-ready state to the supply-prohibited state by the DC voltage (for example, +12 VIL_D) supplied from the first power supply being cut off via the first interlock switch.

Perspectives 4 to 6

The switch device may be a relay (for example, the relay RL3) including two contact points and a coil for opening and closing the two contact points. The DC voltage supplied from the first power supply may be applied to a first end of the coil as the operating voltage of the coil. A switch (for example, the transistor Tr3) connected to a second end of the coil may be further provided. Such a switch can cut off the supply of electric power to a load independently from an interlock mechanism. The switch device may be a semiconductor switch (a field-effect transistor (FET)).

Perspective 7

The first power supply may include a first power supply circuit (for example, the 24 V power supply 313) that generates a first DC voltage and a second power supply circuit (for example, the 12 V power supply 312) that generates the second DC voltage. The first power supply circuit is connected to the first supply system (for example, +24 V_D, +24 VIL_D) and is configured to supply the first DC voltage to the first supply system. The first switching element (for example, the relay RL3) is configured to operate via the second DC voltage supplied via the first interlock switch. When supply of the second DC voltage to the first switching element is cut off via the first interlock switch, supply of the first DC voltage via the first supply system is cut off via the first switching element.

Perspective 8

The 12 V power supply 322 and the 24 V power supply 322 of the fixing apparatus 120 are each an example of a second power supply that converts AC voltage supplied from an AC power supply into DC voltage (for example, +24 V). The +24 VIL_F may be understood as a second supply system that supplies the second load with the DC voltage generated by the second power supply. As illustrated in FIG. 4, the relay RL6 is an example of a second switching element that switches between a supply-ready state and a supply-prohibited state for the DC voltage from the second supply system. The second switching element may be configured to switch between the supply-ready state and the supply-prohibited state in sync with at least the first switching element turning on and off. In this manner, even when electric power is not supplied directly to the load of the second apparatus from the first apparatus, operation of the load of the second apparatus can be stopped when the first door is open.

Perspective 9

The second switching element may include a switch device (for example, the relay RL6) that operates via DC voltage supplied from the second power supply. The switch device may switch from on to off by the DC voltage supplied from the first power supply being cut off via the first interlock switch. In this manner, the switch device may cut off supply of DC voltage to the second load from the second supply system.

Perspectives 10 to 12

The switch device may be a relay (for example, the relay RL6) including two contact points and a coil for opening and closing the two contact points. The DC voltage supplied from the first power supply may be applied to a first end of the coil. In other words, the relay may turn to off when the DC voltage supplied from the first power supply is cut off via the interlock mechanism of the first apparatus. A switch (for example, the transistor Tr6) connected to a second end of the coil may be further provided. Such a switch can control the supply of electric power to a load independently from an interlock mechanism. The switch device may be a semiconductor switch (for example, a FET).

Perspective 13

The second apparatus (for example, the fixing apparatus 120) may include the second power supply connected to an AC power supply and a second load (for example, the motor M21) provided inside the second housing and a third load (for example, the motors M22 to M24). The second apparatus may include a second door (for example, the cover 204) capable of opening and closing forming a portion of the second housing and a second interlock switch (for example, the switch SW4) that switches between on and off in sync with opening and closing of the second door. The +24 VIL_F may be understood as a second supply system that supplies the third load with electric power generated by the second power supply. The relay RL4 is an example of a second switching element that switches between a supply-ready state and a supply-prohibited state for electric power from the second supply system. The second switching element may be configured to switch between the supply-ready state and the supply-prohibited state in sync with at least the second interlock switch turning on and off. The supply and cut off of an operating voltage required for operation of the second load (for example, the motor M21) is switched between in sync with the first switching element provided in the first apparatus turning on and off. In this manner, the first apparatus and the second apparatus may include an independent interlock mechanism. However, the second load of the second apparatus may be cut off from the operating voltage by the interlock mechanism of the first apparatus.

Perspective 14

The second power supply may include a third power supply circuit (for example, the 24 V power supply 323) that generates a third DC voltage and a fourth power supply circuit (for example, the 12 V power supply 322) that generates the fourth DC voltage. The third power supply circuit is connected to the second supply system (for example, +24 V_F, +24 VIL_F) and is configured to supply the third DC voltage to the second supply system. The second switching element (for example, the relay RL6) is configured to operate via the second DC voltage supplied via the first interlock switch (for example, the switch SW3). When supply of the second DC voltage (for example, +24 VIL_D) to the second switching element is cut off via the first interlock switch, supply of the third DC voltage via the second supply system is cut off via the second switching element.

Perspective 15

As illustrated in FIG. 4, the operating voltage required for operation of the second load may be the third DC voltage via the second supply system. The supply of the third DC voltage to the second load may be cut off by the supply of the third DC voltage to the second switching element (for example, the relay RL6) being cut off via the second interlock switch (for example, the switch SW4). In this manner, the supply of the operating voltage to the second load may be independently cut off via two interlock mechanisms.

Perspective 17

As illustrated in FIG. 1, the first apparatus may include the conveying apparatus 110. The second apparatus may include the fixing apparatus 120 that fixes a toner image transferred to the sheet on the sheet. The fixing apparatus 120 includes the second load. The first apparatus and the second apparatus may be two adjacent post-processing apparatuses. The first apparatus and the second apparatus may be two adjacent sheet feeding apparatuses that feed a sheet to the image forming apparatus 100.

Perspective 18

The housing 200 is an example of a first housing provided with a transfer unit that transfers a toner image to a recording medium. The housing 210 is an example of a second housing provided downstream of the first housing in the conveyance direction in which the recording medium is conveyed. The second housing is provided with a conveying unit (for example, the conveying apparatus 110) that conveys a recording medium that is discharged from the first housing and that has a toner image transferred on it. The housing 220 is an example of a third housing connected to the second housing. The third housing is provided with a fixing unit (for example, the fixing apparatus 120) that fixes a toner image to the recording medium that is discharged from the second housing and that has a toner image transferred on it.

The second housing may include a motor (for example, the motors M11, M12) that drives the conveying unit and a first door (for example, the cover 203) that forms a portion of the second housing and that is opened to expose the inside of the second housing. Furthermore, the second housing may include a first switch (for example, the relay RL3). The first switch is provided on the electric path connecting the power supply and the motor. The power supply may be provided inside the first housing, the second housing, or the third housing, or may be provided outside of these. The first switch switches between a first state in which the power supply and the motor are connected and a second state in which the motor is cut off from the power supply. When the first door is opened in a state where the first switch is in the first state, the first switch switches from the first state to the second state.

The third housing may include a load (for example, the fixing roller 55, the heating belt 53, and the motor M21) supplied with electric power from the power supply via the first switch in a state where the first switch is in the first state. When the first door is opened in a state where the first switch is in the first state, the first switch switches from the first state to the second state, causing the supply of electric power to the load to be cut off.

The first switch may include a switch device (for example, the relay RL3) that operates via electric power supplied from the power supply. The electric power supplied to the switch device may be supplied when the first door is opened. In other words, when the first door is open, the electric power may not be supplied to the switch device.

The third housing may include a second power supply (for example, the 12 V power supply 322 and the 24 V power supply of the fixing apparatus 120) and a second switch (for example, the relay RL6) provided on the electric path connecting the second power supply and a load. The second switch switches between a third state in which the second power supply and the load are connected and a fourth state in which the load is cut off from the second power supply. The second switch is put in the third state when the first switch is in the first state and is put in the fourth state when the first switch is in the second state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-209555, filed Dec. 17, 2020 which is hereby incorporated by reference herein in its entirety.

What is claimed is:

1. An image forming system comprising:
   a first housing provided with a transfer unit that transfers a toner image to a recording medium;
   a second housing provided downstream of the first housing in a conveyance direction in which the recording medium is conveyed, the second housing including a conveying unit that conveys the recording medium that is discharged from the first housing and on which the toner image transferred; and a third housing connected to the second housing, the third housing including a fixing unit that fixes the toner image to the recording medium that is discharged from the second housing and on which the toner image transferred, wherein the second housing comprises:
   a motor that drives the conveying unit;
   a door that forms a portion of the second housing and is opened to expose an inside of the second housing; and
   a switch provided on an electrical path connecting a power supply and the motor, the switch switching between a state in which the power supply and the motor are connected and a second state in which the motor is cut off from the power supply, and the switch switching from the first state to the second state when the door is opened in a state where the switch is in the first state, wherein the third housing comprises a load supplied with electric power from the power supply via the switch in a state where the switch is in the first state, and wherein, when the door is opened in a state where the switch is in the first state, the switch switches from the first state to the second state, causing supply of electric power to the load to be cut off.

2. The image forming system according to claim 1, wherein the switch includes a switch device that operates via electric power supplied from the power supply, and
   wherein the electric power supplied to the switch device is supplied when the door is opened.

3. The image forming system according to claim 1, wherein the power supply includes:
   a power supply circuit that generates a DC voltage; and
   a second power supply circuit that generates a second DC voltage,
   wherein the first power supply circuit is connected to the switch,
   wherein the switch is configured to operate via the second DC voltage, and
   wherein, when supply of the second DC voltage to the switch is cut off, supply of the first DC voltage via the switch is cut off.

4. The image forming system according to claim 1, wherein the switch is a switch and the power supply is a power supply,
   wherein the third housing includes:
     a second power supply; and
     a second switch provided on an electric path connecting the second power supply and the load, the second switch switching between a third state in which the second power supply and the load are connected and a fourth state in which the load is cut off from the second power supply, and
   wherein the second switch is put in the third state when the switch is in the first state and is put in the fourth state when the switch is in the second state.

5. The image forming system according to claim 4, wherein the second switch includes a switch device that operates via DC voltage supplied from the second power supply, and
   wherein the switch device switches from on to off, cutting off supply of DC voltage to the load from the second power supply, when DC voltage supplied from the second power supply is cut off.

6. A system comprising:
a housing; and
a second housing configured to connect to the first housing,
wherein the first housing comprises:
   a first load provided inside the first housing;
   a door that forms a portion of the first housing and is opened to expose an inside of the first housing; and
   a switch provided on an electric path connecting a power supply and the first load, the switch switching between a state in which the power supply and the first load are connected and a second state in which the first load is cut off from the power supply, and the first switch switching from the first state to the second state when the door is opened in a state where the switch is in the first state;

wherein the second housing comprises
   a second power supply connected to an AC power supply;
   a second load and a third load provided inside the second housing;
   a second door that forms a portion of the second housing and is opened to expose an inside of the second housing; and
   a second switch provided on an electric path connecting the second power supply and the third load, the second switch switching between a third state in which the second power supply and the third load are connected and a fourth state in which the third load is cut off from the second power supply; and wherein, when the door is opened in a state where the switch is in the first state, the first switch switches from the first state to the second state, causing supply of electric power to the second load to be cut off.

7. The system according to claim 6, wherein the first power supply includes:
   a power supply circuit that generates a DC voltage; and
   a second power supply circuit that generates a second DC voltage,
   wherein the first power supply circuit is connected to a switch,
   wherein the switch is configured to operate via the second DC voltage,
   wherein, when supply of the second DC voltage to the switch is cut off, supply of the first DC voltage via the switch is cut off,
   wherein the second power supply includes a third power supply circuit that generates a third DC voltage,
   wherein the third power supply circuit is connected to the second switch,
   wherein the second switch is configured to operate via the second DC voltage, and
   wherein, when supply of the second DC voltage to the second switch is cut off, supply of the third DC voltage via the second switch is cut off.

8. The image forming system according to claim 7, wherein an operating voltage required for operation of the second load is the third DC voltage via the second switch, and supply of the third DC voltage to the second load is cut off by supply of the third DC voltage to the second switch being cut off.

* * * * *